UNITED STATES PATENT OFFICE.

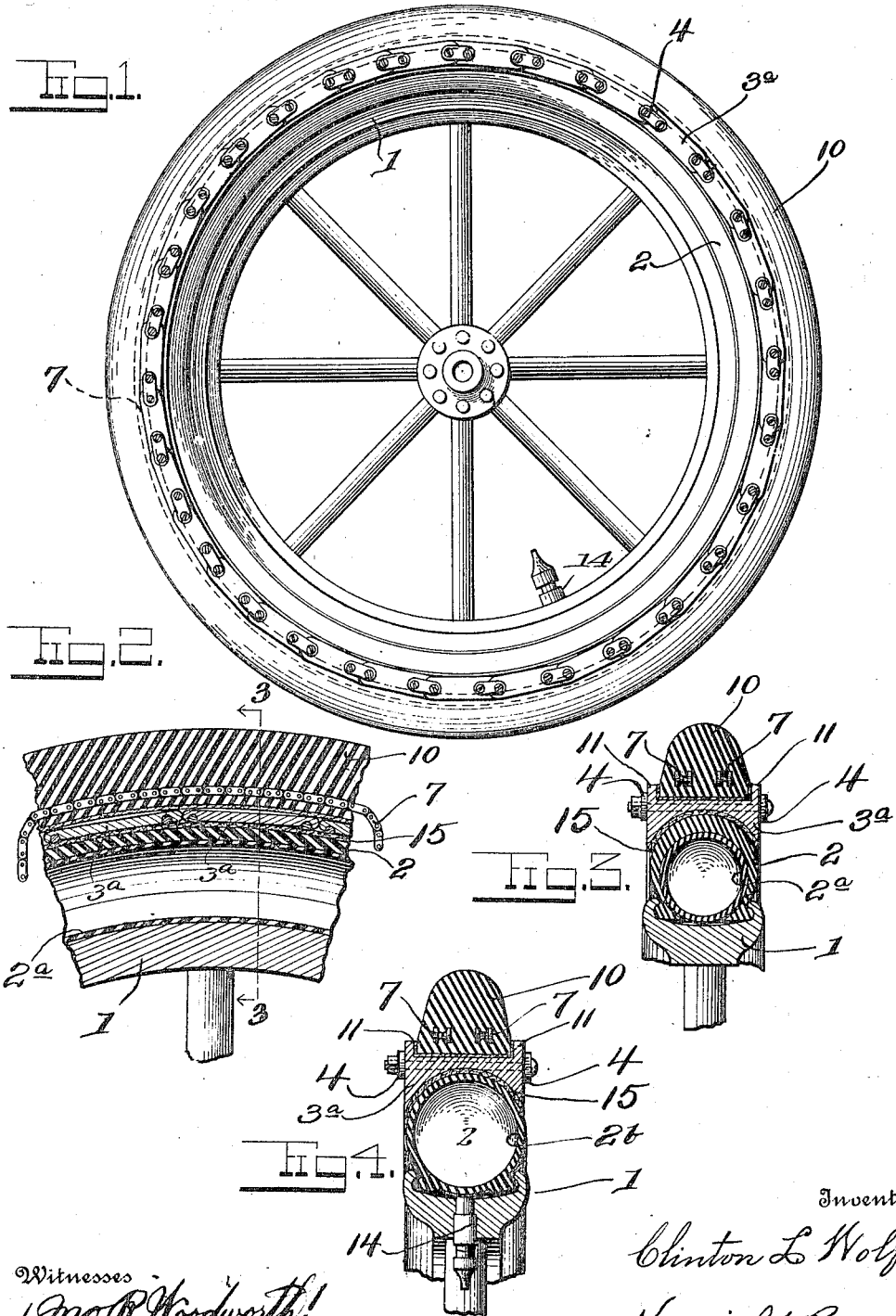

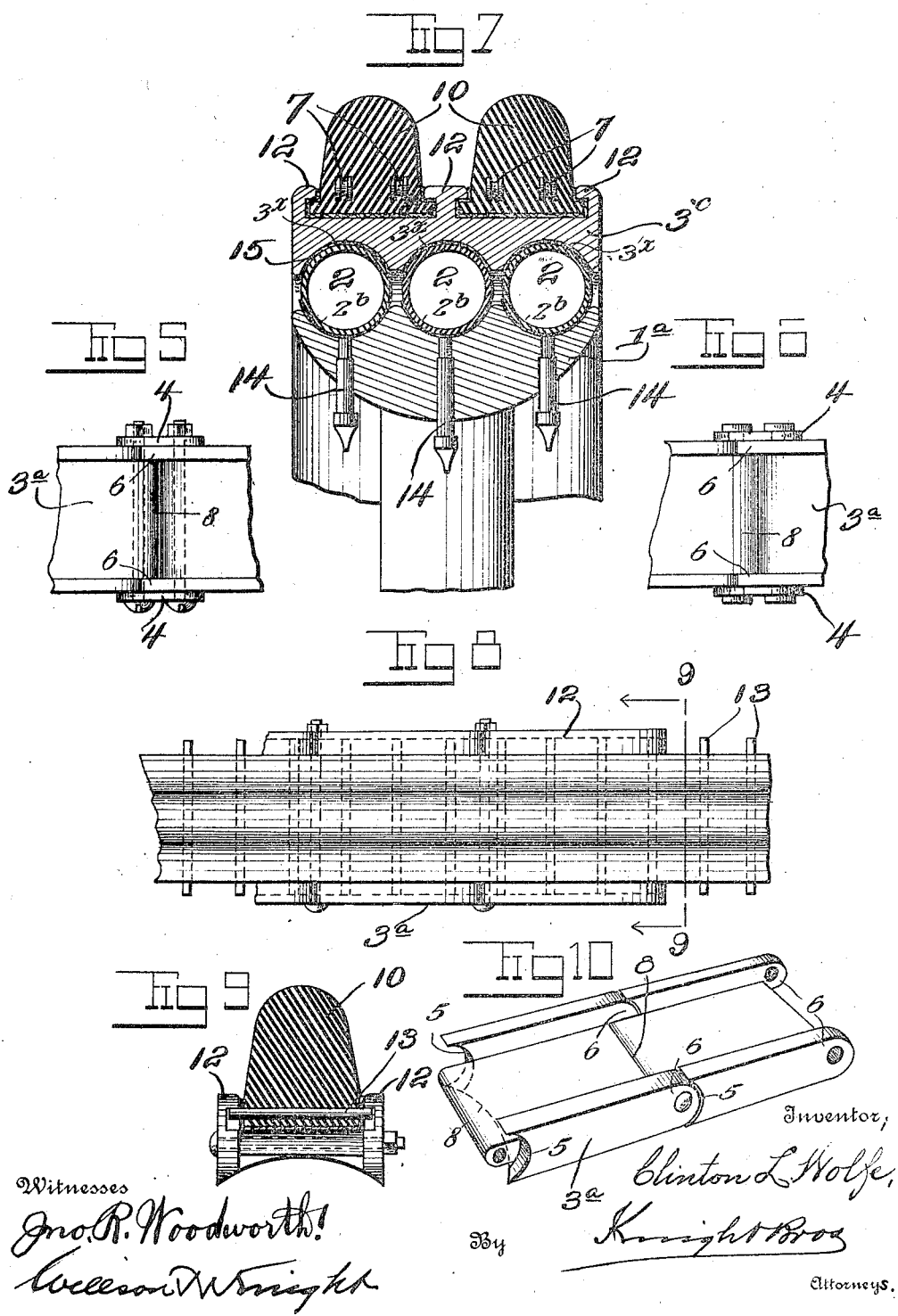

CLINTON L. WOLFE, OF BROOKLYN, NEW YORK.

RUBBER-TREAD FLEXIBLE ARMOR FOR PNEUMATIC TIRES.

1,155,025.    Specification of Letters Patent.    Patented Sept. 28, 1915.

Application filed June 7, 1913. Serial No. 772,324.

*To all whom it may concern:*

Be it known that I, CLINTON L. WOLFE, a citizen of the United States, residing at Brooklyn, in the county of Kings and State of New York, have invented certain new and useful Improvements in Rubber-Tread Flexible Armor for Pneumatic Tires, of which the following is a specification.

This invention relates to a metallic armor adapted to be applied to existing pneumatic tires and sub-divided for the purpose of securing local resiliency at any point at which the tire may bear and having a tread of elastic material surrounding the armor.

One object of the invention is to provide an armor of this type, which will be self-sustaining upon the inflated tire, without the use of means for attaching its parts to the shoe of the tire or to the wheel, to which end the sub-divisions or pieces of the armor which are relatively movable to permit them to yield locally, are not only connected together to prevent circumferential separation as heretofore, but they are provided with interlocking bearings one upon another, which resist relative displacement in the direction of the wheel's radius and, therefore, prevent torsional displacement between the armor pieces, without which the inner concave bearing face of the complete armor ring cannot escape from the convex surface of the inflated tire. This interlocking thrust bearing is preferably developed by the conforming concave-convex ends with which the armor pieces abut against one another, in which case the connections for resisting circumferential separation are best provided by short links pivoted to each piece on opposite sides of the joints which they overlap; but this alining connection or interlocking abutment may be measurably realized by rabbeting together the ends of the armor pieces and extending a pintle through the intersecting parts, which form of connection may serve as the circumferential tensioning connection as well.

A further object is to provide a strong and durable tensioning reinforce for the outer elastic tread received in the outer channel of the armor and to employ this tensioning reinforce as a further means of sustaining the jointed armor; to which end a solid rubber outer tread, fitted in the outer channeled surface of the annular armor, is provided with a plurality of chains embedded therein constructed with flexibility in the direction of the wheel's radius.

A further object is to adapt a cushion tread armor of the general type described, for use on heavy vehicle or truck wheels, to which end a further feature of the invention consists in providing the main wheel with a plurality of circumferential pneumatic tires arranged parallel to each other and to construct the flexible armor with a corresponding number of concave seats on its inner surface to receive said pneumatic tires, and with one or more channels in its outer surface to receive one of a plurality of elastic treads. A satisfactory embodiment of this feature of the invention is provided by employing three pneumatic tires to support the armor and two elastic treads around the outside of the armor. But the relative numbers of the inner and outer resilient members and consequent shaping of the metallic armor to receive the same may be varied as circumstances may dictate.

Several embodiments of the invention are shown by way of illustration in the accompanying drawings, in which—

Figure 1 is a side elevation of a complete wheel provided with an elastic tread armor constructed in accordance with my invention; Figs. 2 and 3 are sections of the same taken, respectively, in the middle plane of the wheel and on a radius of the wheel; Fig. 4 is a view similar to Fig. 3, showing the use of a single tube inflatable tire; Figs. 5 and 6 are plan views showing a portion of the armor employed in Figs. 1 to 4; Fig. 5 showing the link pintles provided by through bolts, and Fig. 6 showing such pintles provided by studs formed integrally with the armor pieces; Fig. 7 is a radial section of the outer portion of a wheel showing an embodiment of my invention suitable for wheels designed to bear heavy loads; Figs. 8 and 9 show by plan view and radial section, a modified means for holding the elastic tread upon the armor ring; and Fig. 10 is a perspective view showing a construction in which the armor pieces are rabbeted together and have their tension connection provided by through bolts concentric with their hinging axes.

1 represents the normal rim and 2 the inflatable tire of a known construction of wheel. The tire 2 may consist of an outer shoe with an inner tube 2 in accordance with common practice, as illustrated in Figs. 2 and 3; or it may consist of a single inflatable tube 2ᵇ with walls sufficient to resist pressure developed in practice, as illustrated in Figs. 4 and 7. In each instance, the tire is preferably connected with the rim of the main wheel 1 with the exception of the embodiment shown in Fig. 7, by the usual clencher construction.

To prevent wear and tear upon the expensive inflatable tire, and still avail of the advantage of a locally yielding wheel tread, a metallic armor comprising an annular series of armor pieces 3ᵃ, is constructed with a concave inner face adapted to fit over the convex surface of the inflated tire in order to come between the inflated tire and the surface over which the vehicle travels. It has heretofore been proposed to use an armor of this general type and to render it locally yielding by making it of a large number of separate armor pieces flexibly connected together, as for instance by links 4 pivoted to the armor pieces at points on opposite sides of the joint across which the link extends. But this form of connection, while desirable to sustain the annular series of armor pieces against circumferential separation, is insufficient to hold the armor upon the wheel, for the reason that it does not sustain the armor pieces with sufficient rigidity against relative displacement in outward or inward radial directions, and the employment of such constructions in connection with means for attaching the armor pieces directly to the shoe of the inner inflatable tire, would defeat the convenient application of the armor to existing wheels, even if not impracticable for other reasons.

According to my invention, as shown more clearly in Figs. 1, 5, 6, 8 and 10 the armor pieces are provided with interlocking abutments one upon another, of such character as will prevent radial displacement of the parts at the joints while in no wise interfering with the free hinging action necessary to develop the locally yielding action which is the main feature of advantage in a pneumatic tire over other forms of springs. According to Figs. 1, 5 and 6 and also according to Figs. 8 and 10, this interlocking abutment is provided by constructing one end of each of the armor pieces 3ᵃ with a concave end 5 and the adjacent end of the next piece with a convex end 6. These concave and convex ends may be limited to the outer edge portions of the armor pieces where the radial dimension is greatest by reason of the presence of the retaining flanges, but it is desirable to also have the intervening portions likewise in contact or sufficiently close to exclude nails or sharp projections that might penetrate the outer elastic tread in order to save the inner inflatable tire or tires from puncture.

In the embodiment shown in Figs. 1, 5 and 6, as well as the embodiment shown in Figs. 8 and 10, the armor pieces are further interlocked by the projection of the body of one armor piece in the form of a tongue 8 in between the flanges of the next armor piece, so as to assist in resisting displacement in the direction of the axis of the wheel.

In Figs. 1, 5 and 6 the armor pieces are held in abutment mainly by the links 4 which sustain them against circumferential separation, but they are also partially sustained by the surrounding elastic tread, particularly if the latter be provided with tension reinforce members 7 to be described. Inasmuch as the armor presents a constantly arched form to the surface over which the vehicle travels and the arch is constantly pressed inward and flattened under the load of the vehicle, it will be seen that the series of armor pieces constitute an annular column of members, each of which has thrust bearing upon the other so that pressure upon any piece cannot displace it relatively to the next piece, but merely develops a hinging action between the pieces. This is due to the interlocking thrust bearings between the pieces. Before the armor could leave the convex surface of the inflated wheel, it would be necessary that not only material stretching take place, but that torsional displacement between the armor pieces exist, as by inward radial movement on one side and outward radial movement on the other. This is securely guarded against by the interlocking butments between the pieces.

According to the construction shown in Fig. 10, the hinging connection which resists circumferential separation, is provided by hinging the rabbeting parts together as by having the tongue 8 on one member project in a recess formed between the projecting ends 6 of the other member, and passing the pintle 9 through the overlapped parts at the axis of hinging action. In this form, the reduced intermediate portions of the armor pieces are formed concave and convex to receive a part of the thrust and assist in preventing displacement.

As shown in Fig. 7, a plurality of inflatable tires 2ᵇ may be employed upon a rim 1ᵃ especially constructed to receive them and the armor 3ᶜ may be made of corresponding width and constructed with a separate seat 3ˣ upon each tire, while its outer surface is grooved to receive a plurality of elastic treads 10 (preferably two), where in the form shown in the remaining figures, but a single outer tread 10 is used. These outer treads when less in number than the inner tires are so disposed as to distribute the transmitted load symmetrically. In Fig. 7, each outer tread receives all the load from an outer tire and half of the load transmitted through the intermediate tire.

The reinforcing chains 7 embedded in the outer elastic treads 10 are flexible radially and they are preferably made of such length that when connected to complete the annulus, they will develop appreciable tension upon the armor and thus assist in sustaining the same as well as holding the cushion tread in place. The side walls of the outer channel or channels of the armor may be straight as shown at 11, in Figs. 3 and 4, or undercut to receive flanged bases of the treads as shown at 12 in Fig. 7.

The outer elastic treads may be secured in position by means of transverse pins 13 extending through the bases of the treads and entering the undercut flanges 12, as shown in Figs. 7 and 9.

14 represents the usual inflating valves for the tires.

15 represents a lining of asbestos or other non-conducting material, preferably incased in fabric, for the purpose of limiting the conduction of heat to the inflatable tire and reducing wear upon the same.

I claim:—

1. An armor for pneumatic tires comprising a circumferentially united series of individual armor-pieces capable of relative angular movement in the plane of the wheel; said pieces being constructed with radially reduced intermediate portions and circumferentially extending lateral enlargements projecting radially, both inward and outward from the intermediate portions, to form seats for an inner inflatable tire and an outer cushioning tread, said lateral enlargements being constructed with radially interlocking arcuate hinging abutments and the reduced intermediate portions of the armor pieces breaking joints with the lateral enlargements, whereby the pieces are interlocked in the direction of the axis of the wheel.

2. An armor for pneumatic tires comprising a circumferentially united series of individual armor-pieces capable of relative angular movement in the plane of the wheel; said pieces being constructed with radially reduced intermediate portions and circumferentially extending lateral enlargements projecting radially, both inward and outward from the intermediate portions, to form seats for an inner inflatable tire and outer cushioning tread, said lateral enlargements being constructed with radially interlocking arcuate hinging abutments and the reduced intermediate portions of the armor pieces breaking joints with the lateral enlargements, whereby the pieces are interlocked in the direction of the axis of the wheel, the means for circumferentially uniting the pieces comprising hinging connections concentric with the arcuate hinging abutments.

3. An armor for pneumatic tires comprising a circumferentially united series of individual armor-pieces capable of relative angular movement in the plane of the wheel; said pieces being constructed with radially reduced intermediate portions and circumferentially extending lateral enlargements projecting radially, both inward and outward from the intermediate portions, to form seats for an inner inflatable tire and an outer cushioning tread, said lateral enlargements being constructed with radially interlocking concave and convex hinging abutments and the reduced intermediate portion on the piece carrying the concave abutments protruding in between the convex abutments of the next piece, and pintles passing through the enlargements carrying said convex abutments and through the said inter-protruding reduced portions and thereby tying the pieces together.

The foregoing specification signed at Washington, District of Columbia, this fifth day of June, 1913.

CLINTON L. WOLFE.

In presence of two witnesses:
 WILLSON H. KNIGHT,
 BENNETT S. JONES.